UNITED STATES PATENT OFFICE.

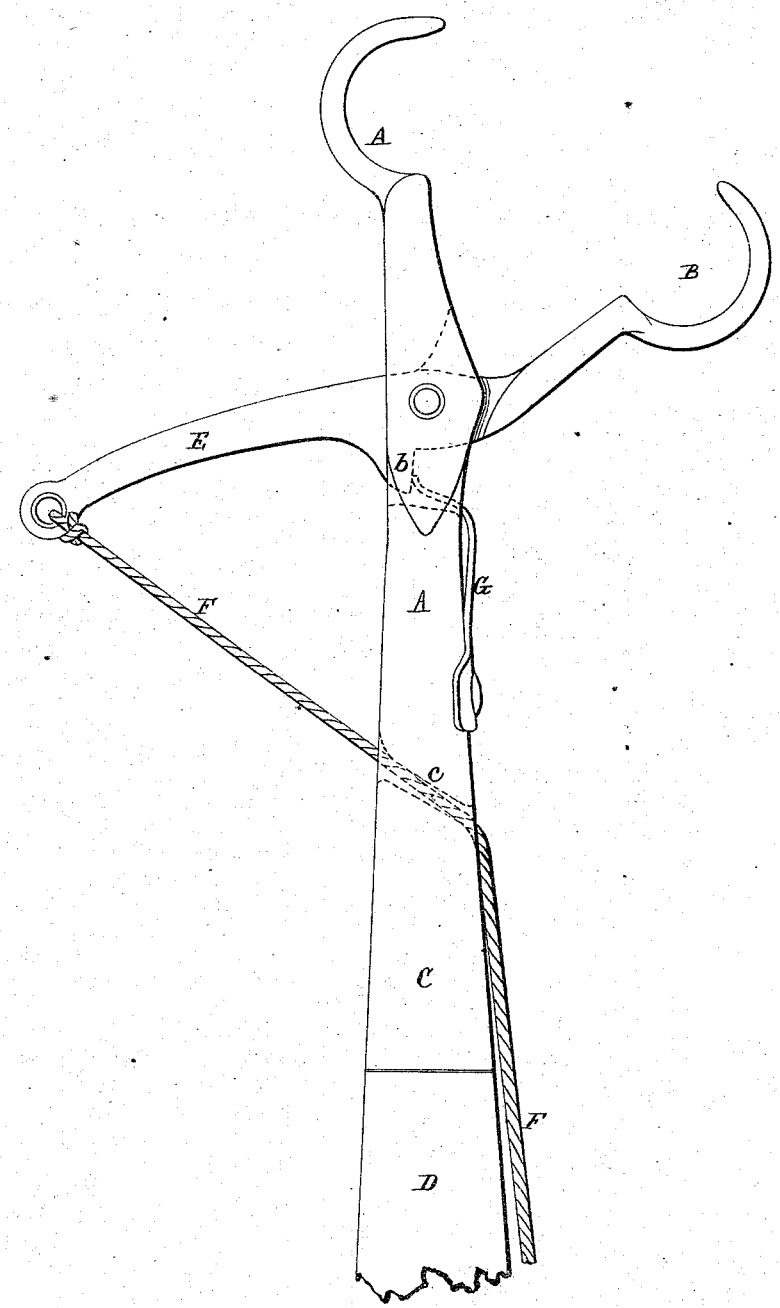

GEORGE STAFFORD AND CHESTER H. SHERMAN, OF GRAFTON, ILLINOIS.

IMPROVEMENT IN HOG-CATCHING IMPLEMENTS.

Specification forming part of Letters Patent No. 158,142, dated December 22, 1874; application filed August 17, 1874.

*To all whom it may concern:*

Be it known that we, GEORGE STAFFORD and CHESTER H. SHERMAN, of Grafton, Jersey county, Illinois, have invented a certain Improvement in Hog-Hooks, of which the following is a specification:

This invention consists in providing one of the jaws of the hook with a cylindrical socket for the reception of a pole or handle, the shank of said socket having an opening through which passes a cord, which is attached to the other jaw, and by means of which cord the jaws are drawn together, the jaws being sprung open and held apart by a spring secured to one of the jaws, and pressing against a lug near the pivot-point of the other jaw. The instrument is for the purpose of seizing and holding a hog by the leg.

The drawing is an elevation of our device.

A is the stationary jaw, and B the movable jaw. The stationary jaw A is provided with a cylindrical socket-extension, C, for the reception of a pole or handle, D. The movable jaw B is provided with an arm, E, to which is secured the end of a cord, F, which passes through an orifice, c, of the extension C, to the hand of the operator. G is a spring secured to the handle-extension C, the free end of which abuts against the lug b of the movable jaw B. Said springs tends to force and hold apart the jaws A B until they are drawn together by the cord F.

In use, a pole, D, will be inserted in the cylindrical socket, C, and the jaws of the instrument brought in contact with the leg of the animal; then, by pulling the cord F, the jaws are drawn together and embrace the leg. After the jaws embrace the animal's leg the pole or handle is removed, and the animal held by means of the cord, the jaws remaining closed as long as any strain is kept upon the cord, and the jaws opening under the influence of the spring when the cord is slackened.

It has been found dangerous to hold the leg of a hog by means of a hook on a pole or handle, as the struggling of the animal is liable to puncture the leg; and to meet the requirements we invented our hook, in which the handle is only used to project the hook, and drawn out after the animal is secured.

We are aware that animal-catchers have been heretofore constructed with jaws which are drawn together by a cord to hold the animal; also, that said jaws have been forced and held together by a spring; and also that the said jaws have been provided with a rack-sector and spring-pawl to lock them closed; and this we do not claim; but

What we claim is—

The animal-catcher having jaws A B upon a head, C, detachable from the handle D, and drawn together by the cord F, and automatically forced open by a spring, G, to release the hold upon the leg of the animal when the tension upon the cord F is removed.

GEORGE STAFFORD.
CHESTER H. SHERMAN.

Witnesses:
JOHN KASLICH,
MICHAEL RUEBEL.